United States Patent [19]

Staffeld

[11] Patent Number: 4,738,696
[45] Date of Patent: Apr. 19, 1988

[54] BAGHOUSE INSTALLATIONS

[76] Inventor: Richard W. Staffeld, 6691 Nicoll Dr., North Ridgeville, Ohio 44039

[21] Appl. No.: 74,093

[22] Filed: Jul. 16, 1987

[51] Int. Cl.⁴ .................................. B01D 46/04
[52] U.S. Cl. ........................... 55/341 R; 55/97; 55/379; 55/302
[58] Field of Search ............... 55/97, 302, 341 R, 369, 55/379, 492, 511

[56] References Cited

U.S. PATENT DOCUMENTS

| | | | |
|---|---|---|---|
| 3,945,400 | 3/1976 | Slakey | 55/302 X |
| 4,289,511 | 9/1981 | Johnson | 55/302 |
| 4,336,035 | 6/1982 | Evenstad et al. | 55/97 |

Primary Examiner—Charles Hart
Attorney, Agent, or Firm—J. Helen Slough

[57] ABSTRACT

The invention pertains to a means for capping a defective or torn fabric filter bag unit used in a baghouse. The capping means comprises a toggle locking mechanism comprising a flat upper plate adapted to cap the venturi opening of the defective filter bag and to be secued in locking engagement with the venturi.

10 Claims, 2 Drawing Sheets

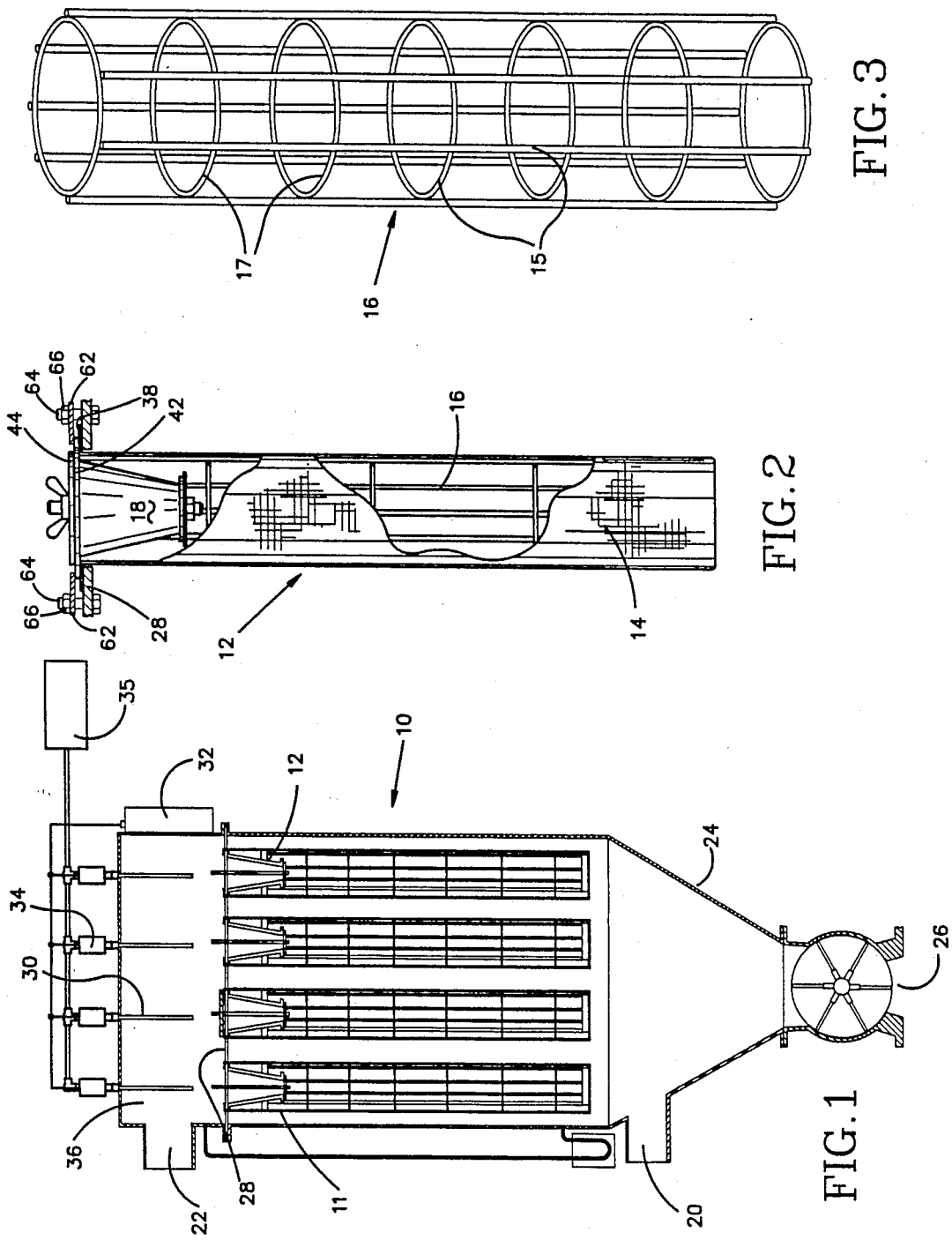

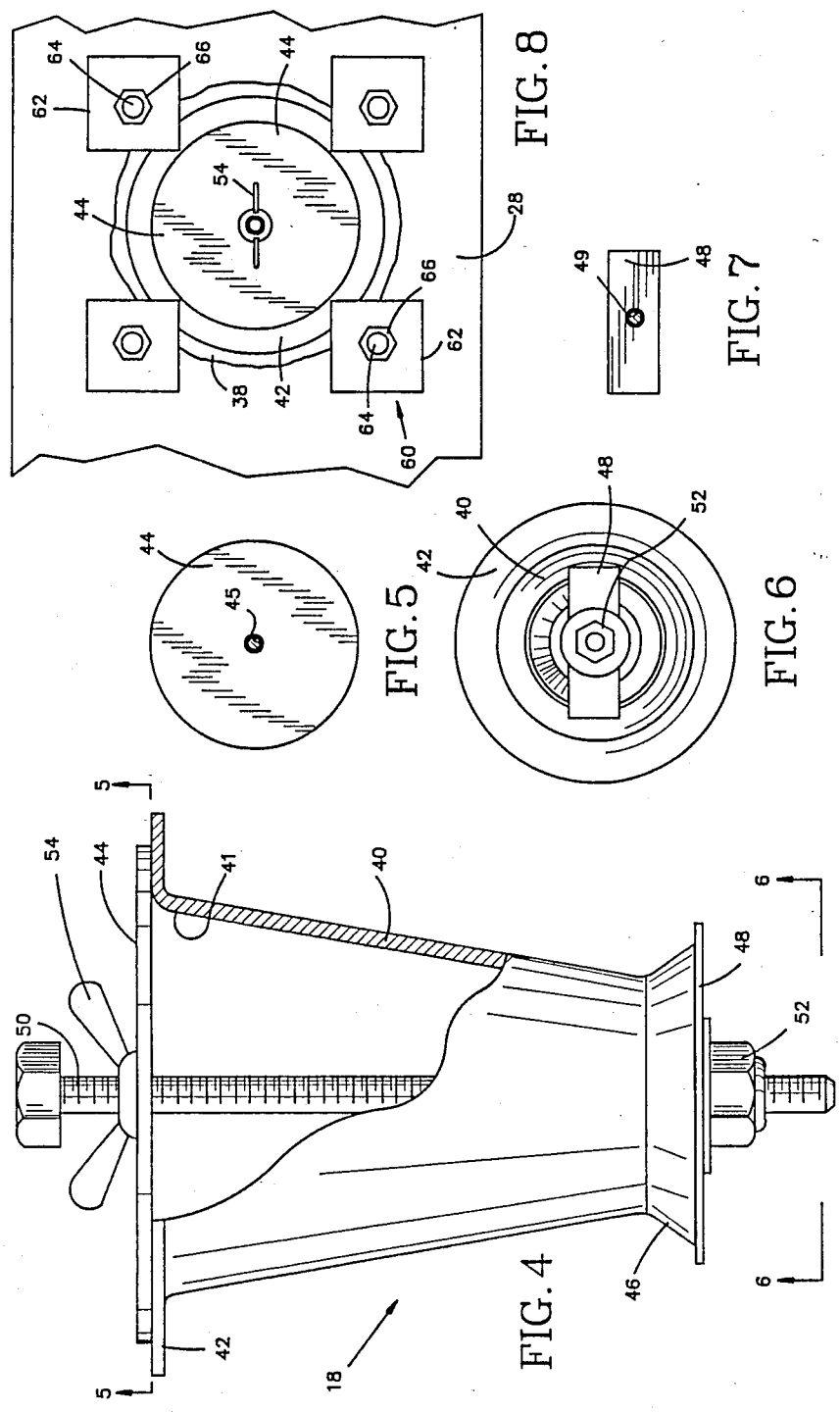

BAGHOUSE INSTALLATIONS

BACKGROUND OF THE INVENTION

This invention pertains to fabric filter bag constructions used in baghouses for controlling air pollution and more particularly to a means for capping damaged filter bag units suspended within the baghouse while in use.

Particulate matter such as dirt or fly ash can be removed from air streams by passing the contaminated air stream into a baghouse and through a series of fabric filter cylindrical bags comprising an elongated tubular shaped fabric bag telescoped over a cylindrical open wire cage. In reverse jet baghouse operations, the contaminated air flow is periodically interrupted while a jet of reversed forced air is applied to the interior of the fabric filter cylinder bag to dislodge particulate matter collected on the exterior surfaces of the filter bags. A venturi nozzle is located above each filter bag and adapted to provide high velocity air releases in short pulses in response to an automatically controlled source of compressed air. To facilitate the direction of the pulsed air within each filter bag, a venturi is interconnected within the top portion of each filter bag unit.

Problems are often encountered with fabric filter bag assemblies where individual filter bag units or cylinders become damaged in use and typically sustain tears or ribs in the fabric filters, which permits unfiltered air to pass through the baghouse. Damaged filter bag units must be individually removed and replaced with a new filter bag unit to maintain the effectiveness of the baghouse filtering system containing a plurality of individual filter bag units. Removing defective filter bag units, however, is a very time consuming operation particularly since the bolts securing the units to an overhead suspending mechanism are often corroded. The corroded bolts and studs often require a torch and welder to remove the same, which causes a costly and time consuming repair operation. Thus, a tear or hole in a single filter bag unit requires a lengthy shut-down of the entire baghouse to merely remove a defective filter bag unit.

It now has been found that a simple and easy means for capping a defective filter bag unit can be installed quickly in a damaged unit without removing the defective unit from the baghouse. The capped filter bag unit effectively prevents unfiltered air from passing through the damaged unit and forces the unfiltered air through the remaining functioning filter bag units. In accordance with this invention, the capping means comprises a toggle locking mechanism adapted to cover the venturi opening in the defective unit to block air from entering the unit whereby the capped damaged unit can remain in the baghouse without harming the baghouse air filtration. In accordance with this invention, the capping means for the venturi comprises a toggle mechanism having a threaded rod adapted to provide locking engagement of an upper flat plate with the upper peripheral flat collar surface of the venturi and a lower elongated wobble locking plate adapted to slip through the lower contracting throat of the venturi and provide locking engagement with the lower end of the venturi. By tightening the locking bolt on the threaded rod the upper plate effectively caps the venturi while the opposite ends of the lower wobble plate overlie opposite ends of the lowermost edges of the venturi locking with the bottom of the venturi to provide secure locking engagement of the capping means for the venturi. Hence, the capped fabric filter bag can be retained attached to the tube sheet within the baghouse until the entire system of filter bags is removed for repair. These and other advantages of this invention will become more apparent by referring to the drawings and the detailed description of the invention.

SUMMARY OF THE INVENTION

Briefly, the filter bag construction comprises a capping means adapted to cap a damaged filter bag unit comprising a fabric bag telescoped over a cylindrical screen cage secured to a metal venturi. The capping means is adapted to cap the upper end of the venturi and comprises an upper flat circular plate and a lower elongated wobble plate, the said plates interconnected by a central threaded rod containing a locking bolt to secure the capping means in locking engagement with the venturi.

IN THE DRAWINGS

FIG. 1 is a front elevation view of the inside of a reverse jet baghouse containing several reverse pulse fabric filter bag units;

FIG. 2 is a front elevation view, with partial sections removed, of a capped fabric filter cylinder unit in accordance with this invention;

FIG. 3 is a front elevation view of a cylindrical wire retainer of the fabric filter cylinder unit shown in FIG. 2;

FIG. 4 is an enlarged front elevation view of the capped venturi of the fabric filter cylinder shown in FIG. 2 with a partial section removed.

FIG. 5 is a bottom view taken along 5—5 in FIG. 4;

FIG. 6 is a bottom view taken along lines 6—6 in FIG. 4;

FIG. 7 is an isolated plan view of the lower wobble plate of the capping mechanism shown in FIG. 4; and FIG. 8 is a top plan view of the capped fabric filter cylinder unit shown in FIG. 2.

DETAILED DESCRIPTION OF THE INVENTION

Referring now to the drawings wherein like reference characters indicate like parts, shown in FIG. 1 is a reverse jet baghouse construction 10 containing a plurality of reverse pulse fabric filter cylinder units 11 and a capped cylinder 12 in accordance with this invention.

With reference to FIG. 1 the baghouse 10 comprises an inlet 20 for receiving dirty air which passes upwardly through the fabric filter cylinder units 11 into an upper plenum 36 and then expelled from the baghouse 10 through an exhaust outlet 22. Each fabric filter cylinder unit 11 comprises a tubular fabric filter 14 telescoped over an internal wire screen cylinder 16 and fitted with a venturi means 18 at the top thereof. The venturi 18 is adapted to be secured in locking engagement with an overhead plate known as a tube sheet 28 supported overhead by the baghouse 10 structure. Located above the row of fabric filter cylinder units 11 and depending downwardly within the upper plenum 36 are a plurality of air nozzles 30 where each nozzle 30 is in alignment with the interior of a venturi 18 and the interconnected tubular fabric bag 14 and wire cylinder 16. The nozzles 30 are connected in series with a source of compressed air 35 where each nozzle 30 is operative by a solenoid valve 34 electrically controlled by a timer 32. The timer 32 actuates timed pulses of compressed air to the nozzles 30 which in turn direct pulses of compressed air downwardly through individual fabric filter cylinders 11. Accordingly, dust and other particulate matter can be blown off the outer surfaces of the tubular fabrics 14 and collected in the bottom collecting hopper 24 and expelled through a discharge port 26.

Further shown in FIG. 1 is a capped fabric filter bag unit 12 in accordance with this invention where a damaged unit is capped without removing the same from the baghouse installation. The capped fabric filter bag unit 12 is shown in more detail in FIG. 2 with portions broken away to better view the internal parts. The capped fabric filter unit 12 is supported by the overhead tube sheet 28 and comprises the outer tubular fabric 14 telescoped over an internal wire cylinder 16 where the fabric 14 is secured at the top rib 38 between the tube sheet surface 28 and the metal venturi 18. The wire cylinder simply comprises laterally spaced parallel vertical wires 15 welded or otherwise secured to a plurality of vertically spaced horizontal wires 17 as best viewed in FIG. 3. The venturi 18 includes an enlarged peripheral flat collar 42 for resting on the top surface of the tube sheet 28 where the collar 42 and fabric rib 38 of the fabric bag 14 are secured together to the tube sheet 28.

Referring now in more detail to the capped venturi 18 of a capped filter bag unit 12, as best viewed in FIG. 4, the venturi 18 comprises a progressively contracting conical venturi body 40 having an enlarged upper flat collar 42 and terminating with a lower peripheral flange member 46. The venturi 18 contains a typical tapered venturi channel within the venturi 18 and the upper flat collar 42 and lower flange 46 peripherally encircle the venturi openings at either end of the venturi 18. The upper opening 41 is adapted to be covered or capped in accordance with this invention. The capping or covering means comprises an oversize circular upper plate 44 adapted to rest on the upper surface of the flat collar 42 to block the opening 41 of the venturi and the upper plate 44 is interconnected with an elongated lower wobble plate 48 adapted to engage the lower peripheral surface of the lower flange 46 of the venturi 18. The interconnection and locking engagement of the upper plate 44 and lower wobble plate 48 with the venturi 18 is actuated by a toggle locking mechanism comprising a threaded rod 50 passing through the central opening 45 in the upper plate 44 and a central opening 49 in the lower wobble plate 48. The central opening 49 in the wobble plate 48 is slightly oversize of the threaded rod 50 whereby the wobble plate 48 can be orientated askew to slip the thus inclined wobble plate 48 through the lower opening and throat of the venturi. Upon passing through the lower venturi opening, the wobble plate 48 assumes a planar locking position substantially perpendicular to the depending rod 50 and engages the outer periphery of the lower venturi flange 46, as shown in FIG. 4. The centrally disposed threaded rod 50 is fitted with a lower lock nut 52 engaging and maintaining the position of the lower wobble plate 48. The upper portion of the threaded rod 50 is fitted with a threaded wing nut 54 adapted to be tightened to provide locking engagement of the upper plate 44 with the upper flat peripheral collar 42 while covering the upper opening 41 of the venturi 18. In the locking mode, the threaded rod 50 imposes locking engagement of the upper plate 44 with the venturi upper collar 42 and locking engagement of the lower wobble plate 48 with the venturi lower flange 46.

Shown in FIG. 6 is a bottom view of the capped venturi shown in FIG. 4 where the lower rectangular wobble plate 48 engages the outer periphery of the bottom of the lower flange 46 of the venturi 18 to provide locking engagement of the wobble plate 48 with the venturi 18. It should be noted that the wobble plate 48 is adapted to be orientated at an angle with the threaded rod 50 while inserting the same in the venturi 18 whereby the wobble plate 48 may readily pass through the restricted throat opening of the venturi 18 and then align itself perpendicularly with the threaded rod 50 in locking engagement with the venturi bottom flange 46 as viewed in FIG. 6.

Referring next to FIG. 8, which is a top plan view of the capped fabric filter cylinder 12, the upper flat collar 42 of the venturi 18 is shown locked to the overhead tube sheet 28 by four lock means 60. Each lock means 60 comprises an engaging plate 62 locked in position by a through bolt 64 and locking nut 66. Thus, the lock means 60 secures the venturi 18 to the tube sheet 28 by locking impingement with the venturi upper flat collar 42 and the upper surface of the tube sheet 28 by secure tightening of the nut 66 with the through bolt 64. These nuts 66 and bolts 64 holding the filter bag units 11 to the tube sheet 28 are tightly secured to the sheet 28 and can be frozen in place or become corroded in use which makes it most advantageous in accordance with this invention to cap a defective filter bag unit 12 rather than removing the same or resort to the time consuming changing of an isolated defective bag filter unit 12 by removal of the bolts, etc.

In use, the functioning fabric filter cylinders 11 are secured to the overhead tube sheet 28 and suspended within a baghouse 10. A damaged or otherwise punctured or torn fabric filter cylinder 12 can be capped in accordance with this invention by inserting the capping means comprising a toggle locking mechanism within the venturi 18 of a damaged bag covering the filter cylinder 12. The lower rectangular wobble plate 48 is orientated askew relative to the perpendicular threaded rod 50 when moving the plate downwardly within the venturi 18 until the lower wobble plate 48 passes through the bottom opening of the venturi 18. The threaded rod 50 can then be pulled upwardly to engage the wobble plate 48 with the bottom periphery of the lower flange 46 of the venturi 18. The upper solid plate 44 is lowered and secured in locking engagement with the upper flat collar 42 of the venturi 18 and secured thereto by tightening the upper wing nut 54. Accordingly, the upper flat plate 44 effectively caps or plugs the defective filter cylinder 12 while maintaining the same secured to the tube sheet 28 along with the other open, non-capped and functional fabric cylinders 11 retained for filtering dirty air passing through the baghouse 10.

Accordingly, the venturi 18 can be capped in accordance with this invention by means comprising an upper plate 44 and a lower wobble plate 48 secured in locking engagement with the venturi 18 by the threaded rod 50. By capping the venturi 18, the damaged fabric filter cylinder 12 can be maintained in the assembly of functioning fabric filter cylinders 11 without causing undesirable bypass of dirty air through the baghouse. Although the capped fabric filter cylinder is maintained in the line, the air filtration effectiveness of the baghouse is continued without elimination of the filtering operation and without down time loss required for replacement or repair of a defective fabric filter.

Although preferred embodiments of this invention are described and shown in the drawings, the invention is not intended to be limited except in the appended claims.

WHAT I CLAIM IS:

1. In combination with a baghouse fabric filter unit adapted to be supported in a baghouse by an overhead tube sheet, a capping means for capping a defective fabric bag filter unit, comprising:

the fabric filter unit comprising a metal venturi and a fabric filter cylinder where the venturi is disposed within and interconnected to the fabric filter cylinder, the fabric filter cylinder comprising a tubular fabric bag telescoped over a wire cylinder, the venturi comprising a venturi body with a venturi opening and an upper peripheral flat collar and a lower peripheral flange around the venturi opening; and a capping means for capping the venturi of the filter unit comprising an upper locking plate adapted to engage the upper flat collar and cover the venturi opening, a lower elongated wobble plate adapted to engage the lower flange, and a locking means operatively interconnected with the upper locking plate and the lower wobble plate to provide locking engagement of the upper locking plate and the lower wobble plate with the venturi.

2. The combination in claim 1 where the wobble plate of the capping means is adapted to wobble askew for entering the venturi opening to enable engagement with the lower flange thereof.

3. The combination in claim 1 where the elongated lower wobble plate comprises a rectangular plate.

4. The combination in claim 1 where the locking means comprises a toggle bolt locking mechanism.

5. The combination in claim 1 where the locking means comprises a threaded rod and an upper threaded locking means and the threaded locking means is adapted to be tightened to lock the upper locking plate to the venturi upper peripheral flat collar.

6. The combination in claim 5 where the threaded locking means comprises a wing nut.

7. A capping means for capping a defective fabric filter unit used in a baghouse, the fabric filter unit comprising a venturi interconnected to a tubular fabric bag telescopped over a wire cylinder, the venturi having an upper peripheral flat collar and a lower peripheral flange surrounding the central venturi opening, the capping means comprising:

an upper flat locking plate adapted to engage the upper flat collar and cover the venturi opening, an elongated lower wobble plate adapted to pass through the venturi opening and engage the outer periphery of the lower flange, and a locking means interconnecting the upper locking plate and the lower wobble plate, where the locking means is adapted to tighten the upper locking plate and lower wobble plate in locking engagement with the venturi.

8. The capping means in claim 7 where the locking means comprises a threaded rod having a locking nut for locking the capping means in tight engagement with the venturi.

9. The capping means in claim 7 where the lower wobble plate is adapted to pass through the venturi opening askew to engage the outer periphery of the lower flange.

10. A method of capping a defective fabric filter unit supported in a baghouse, where the fabric filter unit comprises a metal venturi interconnected with a fabric filter, the venturi containing an upper peripheral flat collar and a lower peripheral flange surrounding the central venturi opening, the method comprising:

providing a capping means comprising an upper locking plate adapted to engage the upper peripheral flat collar and cover the venturi opening, a lower elongated wobble plate adapted to engage the outer periphery of the lower flange, and a locking mechanism interconnected to the upper locking plate and the lower wobble plate to provide locking engagement with the venturi;

inserting the capping means into the venturi opening and causing the lower wobble plate to be orientated askew within the venturi opening;

passing the askewed wobble plate through the lower peripheral flange of the venturi and engaging the outer periphery of the said lower flange with the wobble plate;

locating the upper locking plate in engagement with the upper peripheral flat collar of the venturi and covering the venturi opening; and locking the upper locking plate and lower wobble plate in tight engagement with the venturi.

* * * * *